United States Patent

Jackson

[11] Patent Number: 5,927,155
[45] Date of Patent: Jul. 27, 1999

[54] BICYCLE PEDAL

[76] Inventor: Emmitt K. Jackson, 1650 E. 55th St., Cleveland, Ohio 44103

[21] Appl. No.: 08/770,943

[22] Filed: Dec. 31, 1996

[51] Int. Cl.⁶ ........................................ G05G 1/16
[52] U.S. Cl. ................................................ 74/594.4
[58] Field of Search ........................... 74/594.4–594.6; 601/27; 36/131, 132; 482/57

[56] References Cited

U.S. PATENT DOCUMENTS

| | | | |
|---|---|---|---|
| 1,387,687 | 8/1921 | Chaussinand | 128/51 |
| 2,751,797 | 6/1956 | Pearl | 74/594.4 |
| 4,345,487 | 8/1982 | Straker | 74/563 |
| 4,682,771 | 7/1987 | Jean | 74/594.4 |
| 5,284,066 | 2/1994 | Weiss | 74/594.4 X |
| 5,398,570 | 3/1995 | Chae | 74/563 |

FOREIGN PATENT DOCUMENTS

| | | | |
|---|---|---|---|
| 965611 | 9/1950 | France | 74/594.4 |
| 3728015 | 3/1989 | Germany | 74/594.4 |
| 5-32189 | 9/1993 | Japan | 74/594.4 |

*Primary Examiner*—Vinh T. Luong

[57] ABSTRACT

A depression pedal for bicycles, tricycles, exercise machines and the like. The depression pedal includes a plurality of spring plates (24) for contact by riders' foot. The spring plates (24) is supported by a plurality of compression springs (34) positioned to receive a plurality of threaded rods (48) passing through a plurality of bores (16, 18 and 26) located on the spring plates (24), pedal housing (10) and pedal housing plates (14). The threaded rods (48) receives a plurality of bolt threads (46) that fixate and secures the threaded rods (48) center of the compression springs (34) that is supported by the spring plates (24) holding both the compression springs (34) and spring plates (24) in place. The rider applies force by foot to the depression pedal by pressing down on the spring plate (24) causing the compression springs (34) to depress under the force being applied by the foot of rider.

14 Claims, 12 Drawing Sheets

BICYCLE PEDAL

BACKGROUND

1. Field of Invention

This invention relates to the pedal used manually by foot for bicycles, exercise machines, tricycles and the like.

2. Description of Prior Art

The conventional pedal provides a "non-flexible foot" bearing surface on both sides of the pedal body. By non-flexible, it is meant that the foot bearing surface of the conventional pedal act as brakes to joints and ligaments and does not give in when the foot presses down on the pedal body to move the cycle forward or to accelerate physical movement on a exercise machine.

The problem with the conventional pedal is that the joints and ligaments of the ankle and knee are not allowed to fully extend without the cyclist having to break posture by standing up contorting ones' body to pedal for more thrust and drive, then sit way back on the seat to give the joints and ligaments a rest period from the stress and tension accumulated from the foot bearing down on a surface that is "non-flexible" not giving in to the treading force being applied.

By the conventional pedals' foot bearing surface being non-flexible, the stress on the joints and ligaments increase with each rotation of the pedal body, so is the effort when trying to overcome the brakes being placed on the joints and ligaments created by the foot bearing surface being "non-flexible". The cyclist would have to use the body more strenuously by standing up to exert more effort to move the bicycle forward, or create more speed with stationary exercise machines, while at the same time applying a death grip on the handle bars. This causes more stress and tension on the joints and ligaments of the fingers, palm and wrist, hereby, causing early fatigue, painful joints, ligaments, and a uncomfortable ride. Furthermore, one would have to stay at a slow pace to have a comfortable ride but, the reverse of this slow pace comfort is that nothing significant is being accomplished by means of cardiovascular endurance.

Posture is affected by a "non-flexible" foot bearing a surface of conventional pedals. When the cyclist wants to increase speed by changing to a higher gear, the joints and ligaments become too restricted during preparation in order to increase effort. Therefore, to obtain more speed, the cyclist must over extend the body forward or stand up beyond ones center to overcome the resistance created by the restricted movement of the joints and ligaments caused by the non-flexible foot bearing surface not giving in when treading force is being applied to the pedal.

Posture is permanently improper, the transmission of force is decreased, joint and ligament movement are restricted, and must be overcome by excessive force and effort. Hence, it is virtually impossible with the available foot bearing surface of the conventional pedal to prevent excessive wear and tear on the joints and ligaments of knee, ankle and hands thereby, reducing efficiency to obtain more speed, thrust, drive and a comfortable ride or exercising session.

SUMMARY OF THE INVENTION

The advantages and objection of the present invention is such that it:

(a) reduce tension and stress on the joints and ligaments, while transmitting the treading force on the pedal house.
(b) reduce body effort before, during and after hip thrust, leg drive and before, during and after transition from low to high gears to increase speed.
(c) allows the total body to sit down and participate in transmission of the treading force with less effort.
(d) allows the body and legs to move with less effort comfortably, when maintaining constant speed is the objective.
(e) increase overall control of the cycle and exercise machines for greater maneuverability and
(f) minimize the natural tendency to stand up to add more leg drive and hip thrust.

Furthermore, the present invention provides for the user the ability to reduce significantly, overall body effort to move the bicycle forward and increase speed with varying degrees of speed that require more physical effort per foot rotation of the pedal. These and other objects and advantages will become apparent when consideration is given to the description taken in connection with the enclosed drawings.

BRIEF DESCRIPTION OF DRAWINGS

The understanding of the invention will be understood more clearly when reference is drawn to the following drawings, in which.

Figure 5:
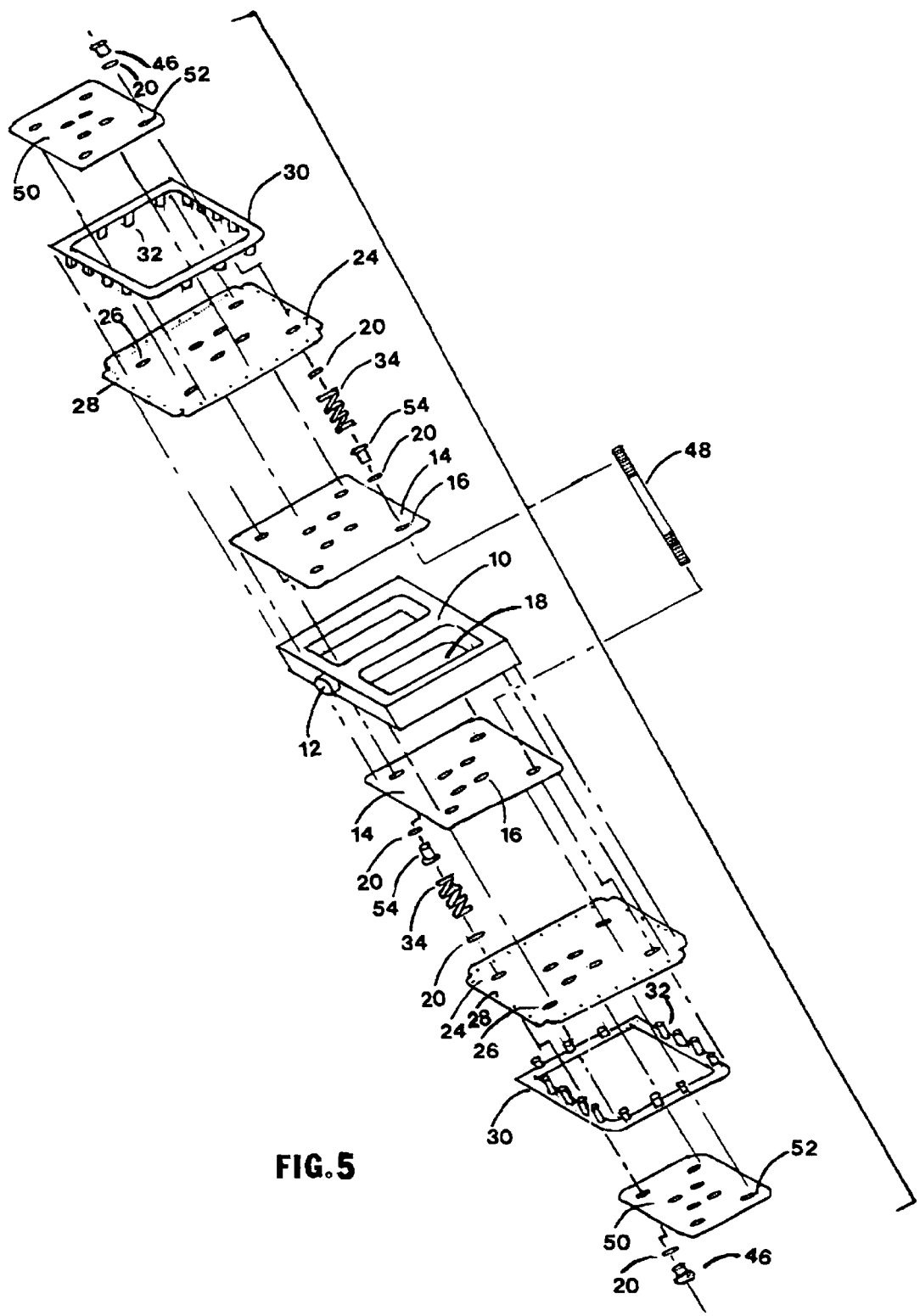
FIG. 5 illustrates an isometric exploded view of the main embodiment.

Please note that FIG. 5 illustrates the minimum number of the same parts numbered 46, 34, 20, and 48. Only one each of these parts are used in the drawing. By doing this it would prevent cluttering of the drawing with excessive parts, making it unclear to read with ease. All of the reference numbers 16, 22, 26, 28, and 52 bores use parts 46, 30, 34, 20, and 48.

Figure 6:
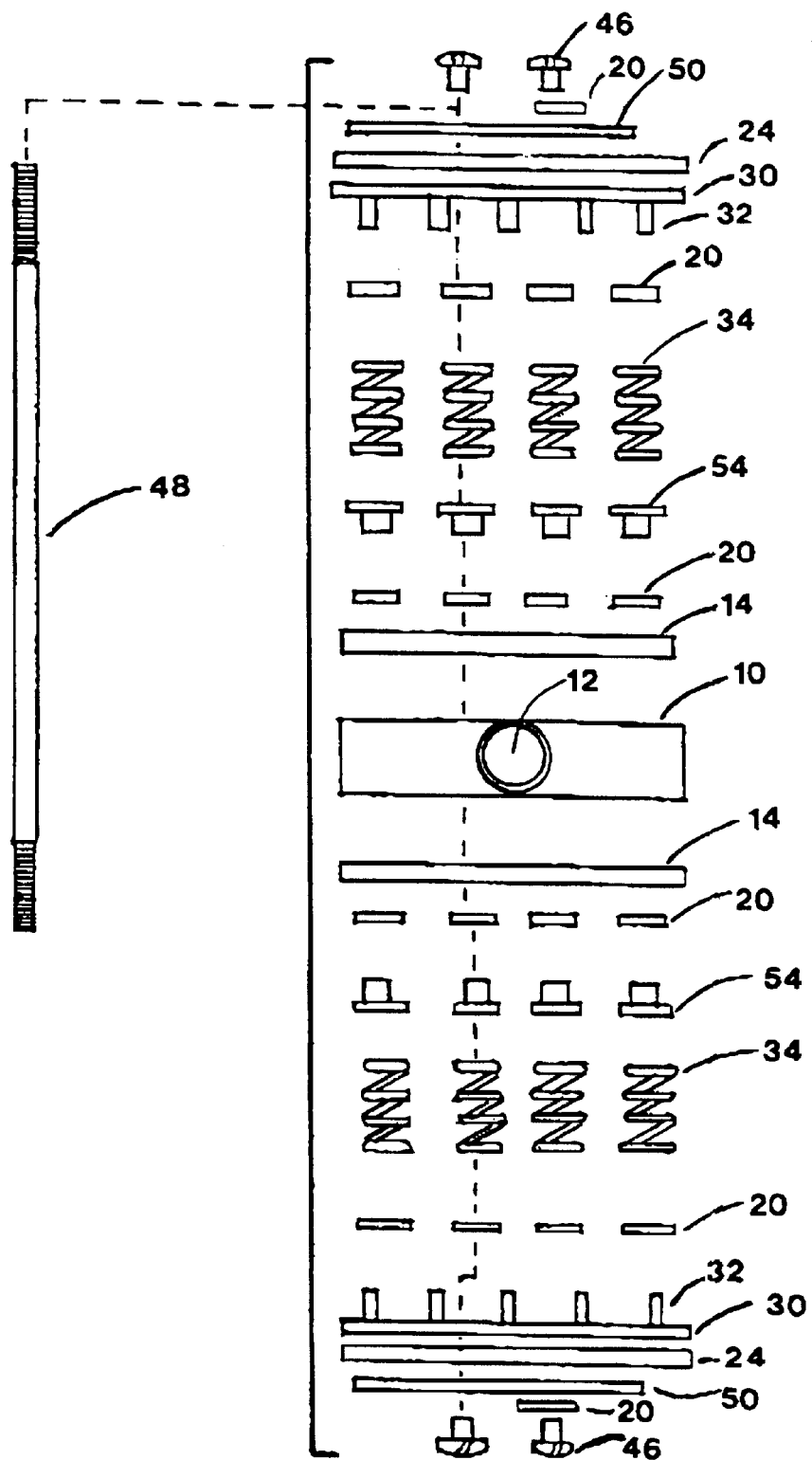

FIG. 6 illustrates a side view of an isometric exploded view of the main embodiment.

Figure 7:
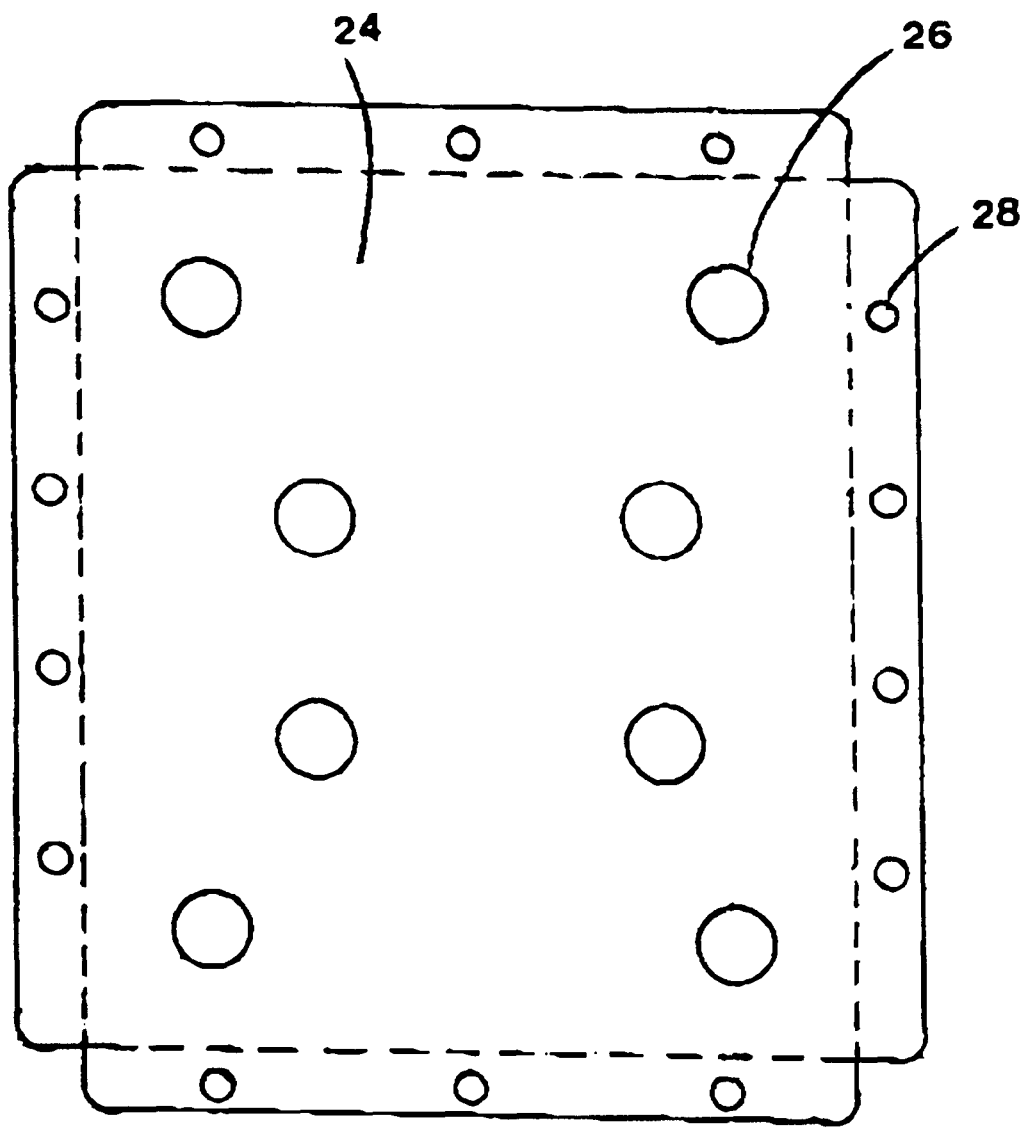

FIG. 7 illustrates the spring plate.

Figure 8:
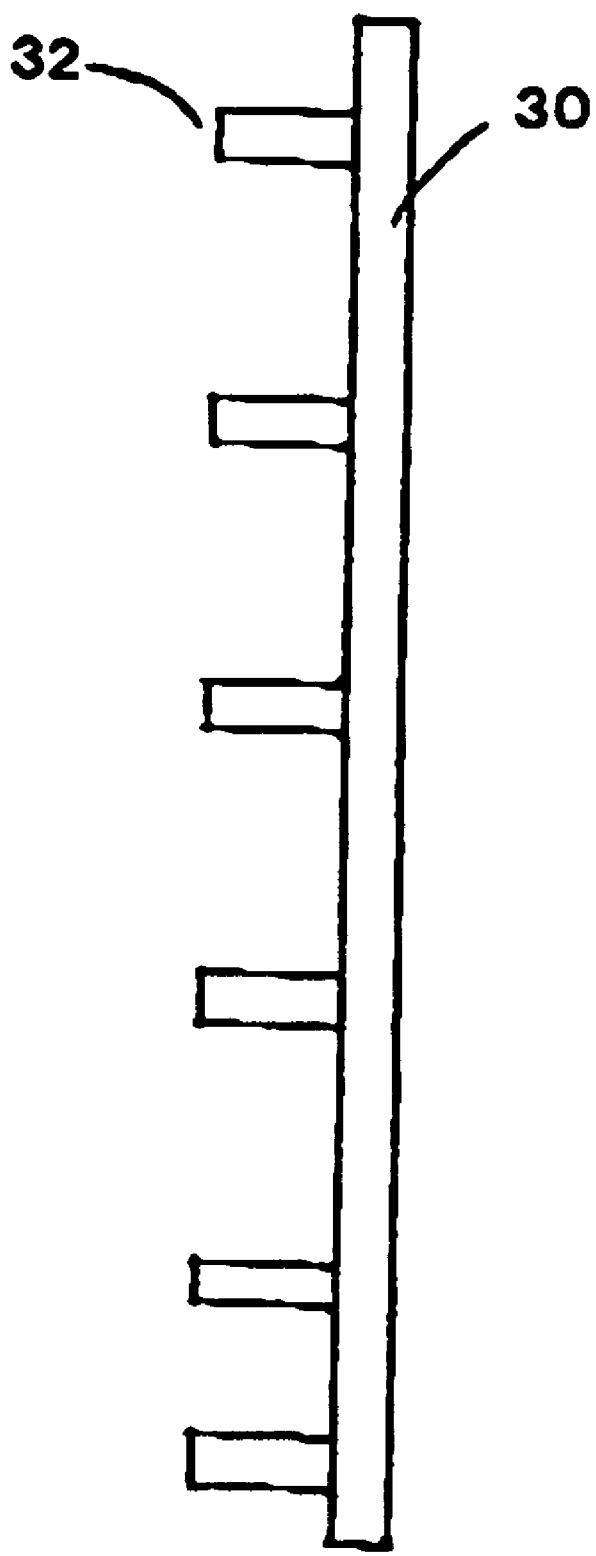

FIG. 8 illustrates the top view of the spring plate bracket with locking pins.

Figure 9:
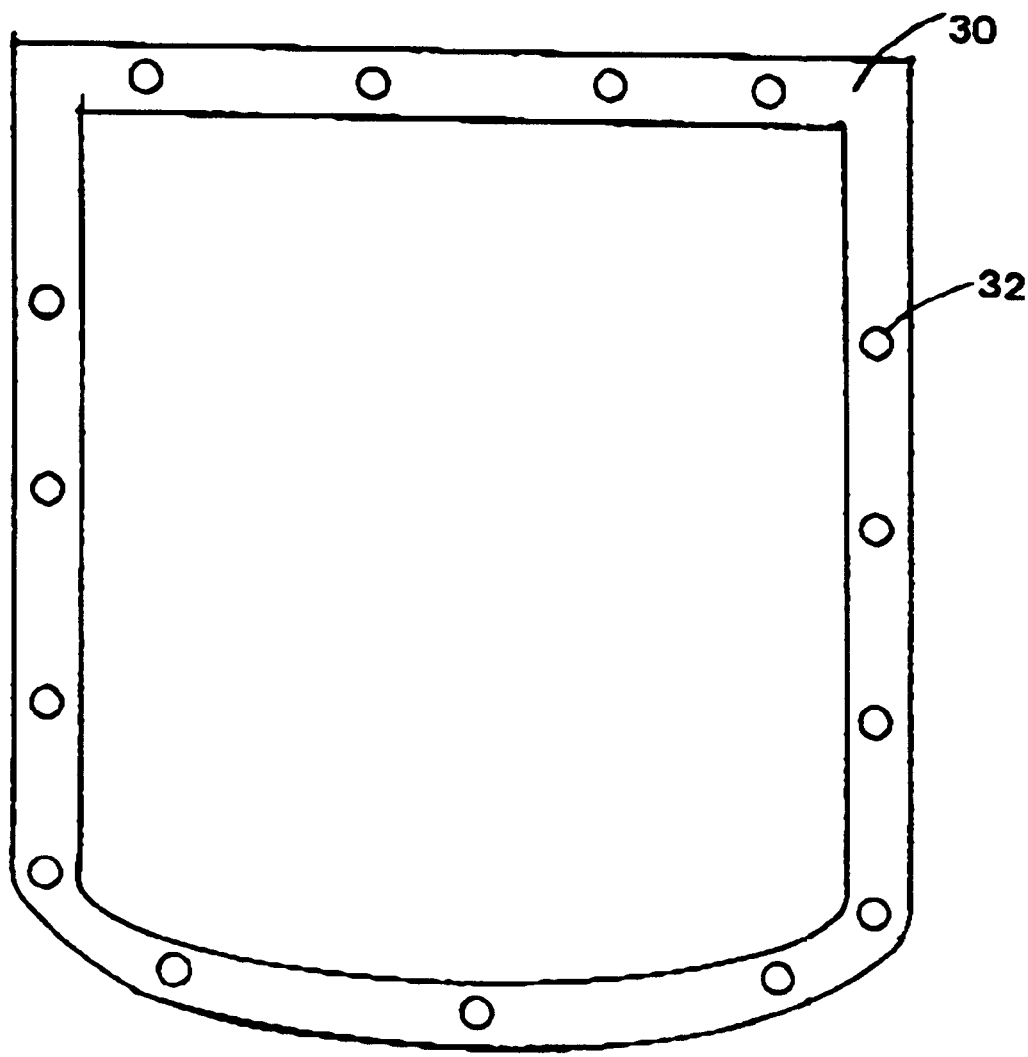

FIG. 9 illustrates the side view of the spring plate bracket with locking pins.

Figure 10:
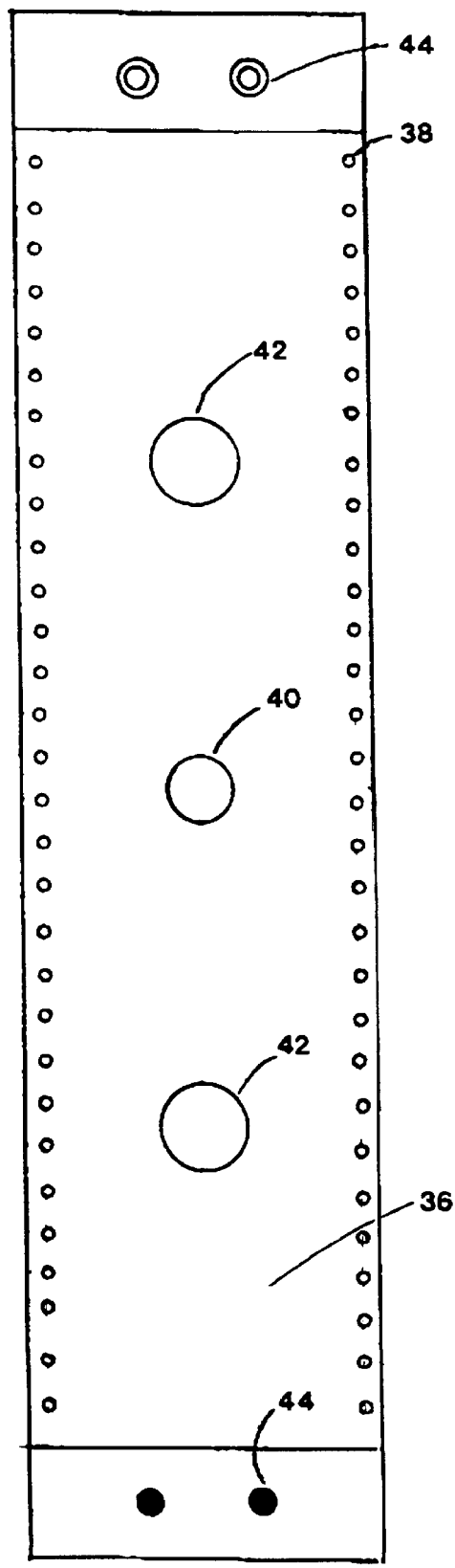

FIG. 10 illustrate the top view of the pedal housing hood.

Figure 11:
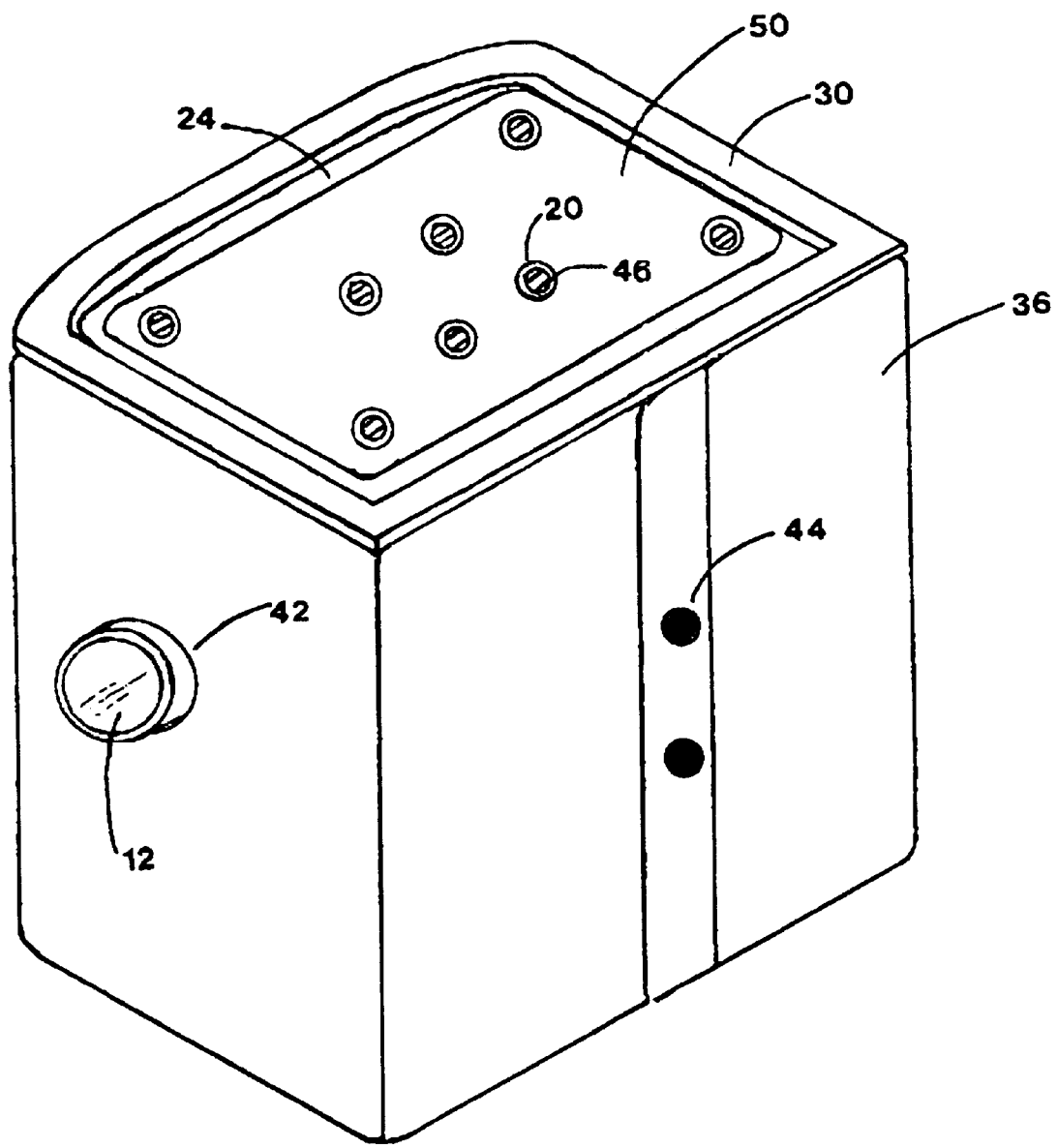

FIG. 11 illustrates the rear view of the pedal housing hood assembled to the main embodiment.

Figure 12:
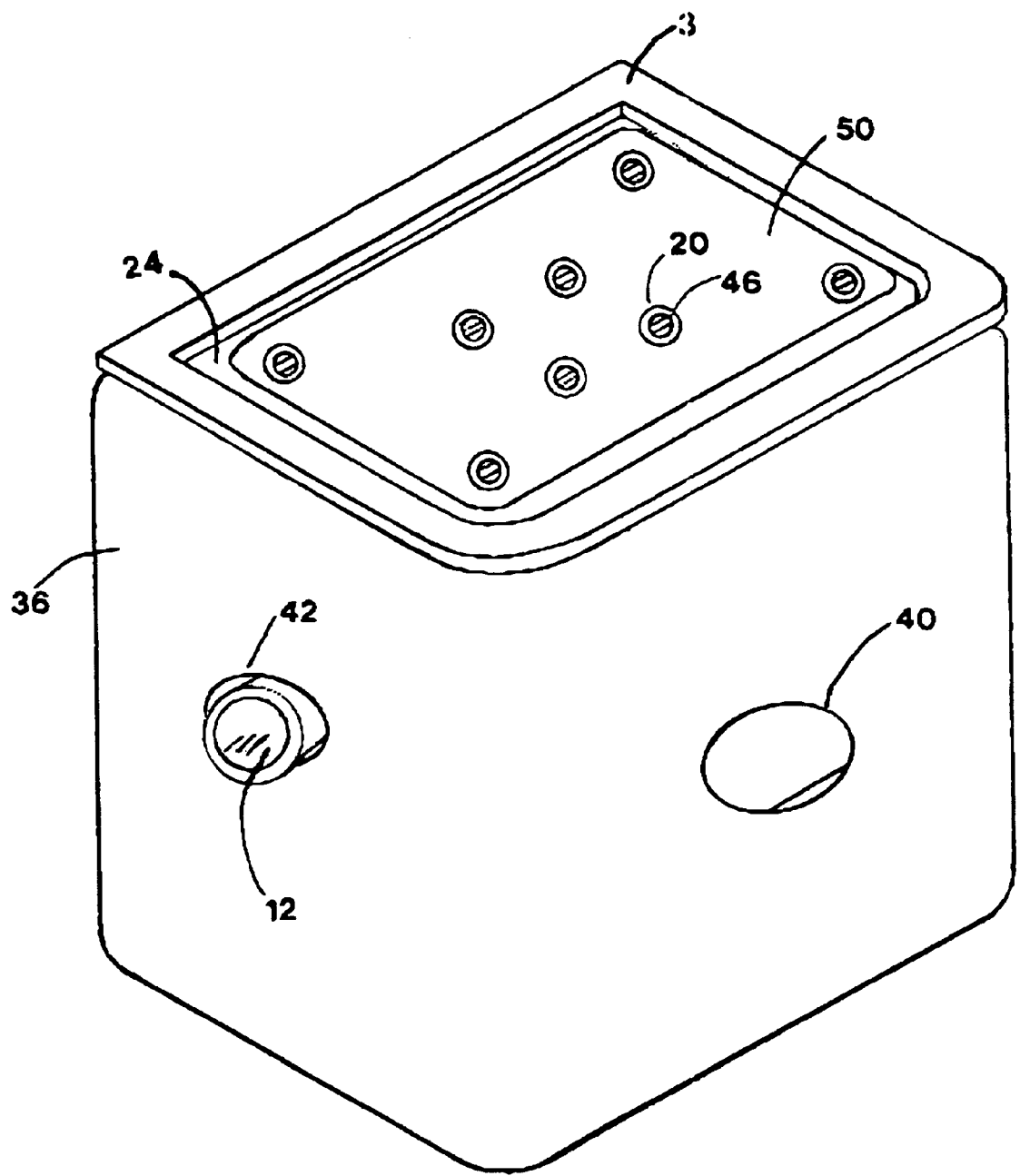

FIG. 12 illustrates the front view of pedal housing hood assembled to the main embodiment.

DESCRIPTION OF THE PREFERRED EMBODIMENTS FIGS. 1–12

Figure 1:
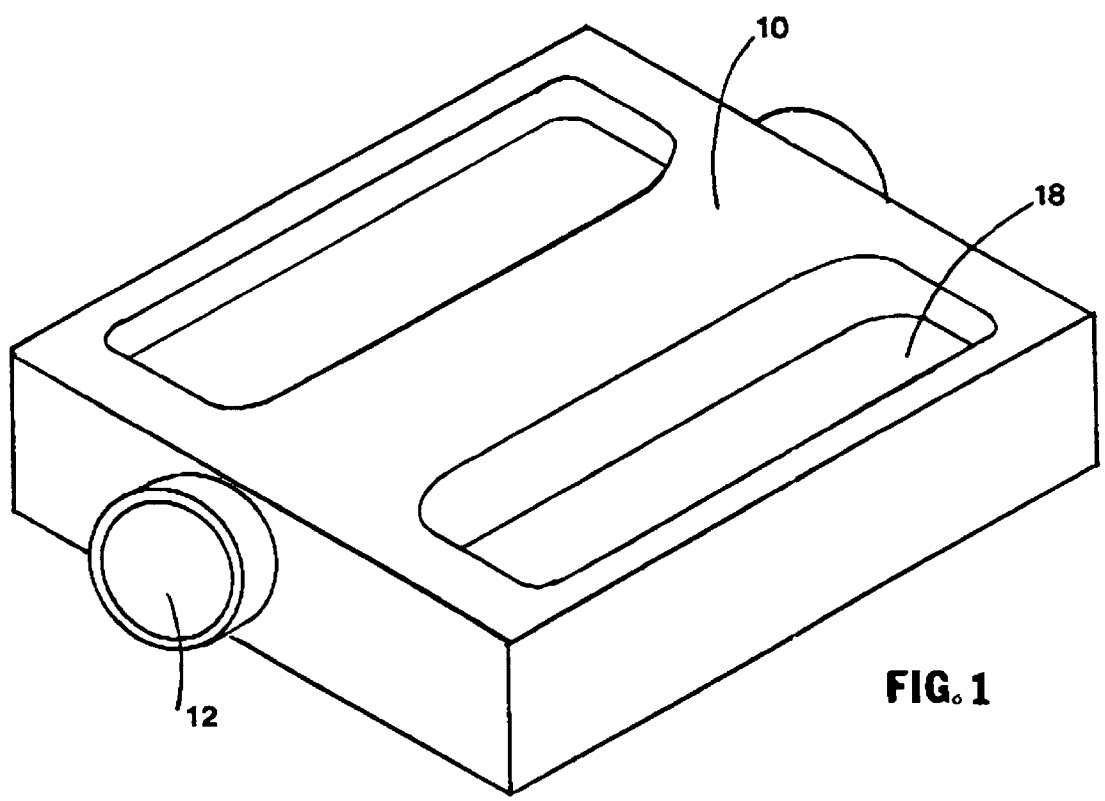
FIG. 1 illustrates a front view of the pedal housing.

Referring to FIG. 1, the pedal housing 10 consists of a non-flexible rigid material which when press down on during transmission of the treading force cannot be flexed by the treading force being applied by foot. At the center of the pedal housing 10 is a bore 12, so as said bore can provide a space for said pedal housing 10 to be rotatable.

The pedal housing 10 can be manufactured from a Hi-tech plastic constructed with two molds, forming two halves joined by bonding means such as adhesive. The pedal housing 10 is squared (cubed) in shape, with oblong bores 18 spaced on the top surface of the pedal housing 10, that allow the threaded rods 48 to pass through to stabilize the spring plates 24.

Figure 2:
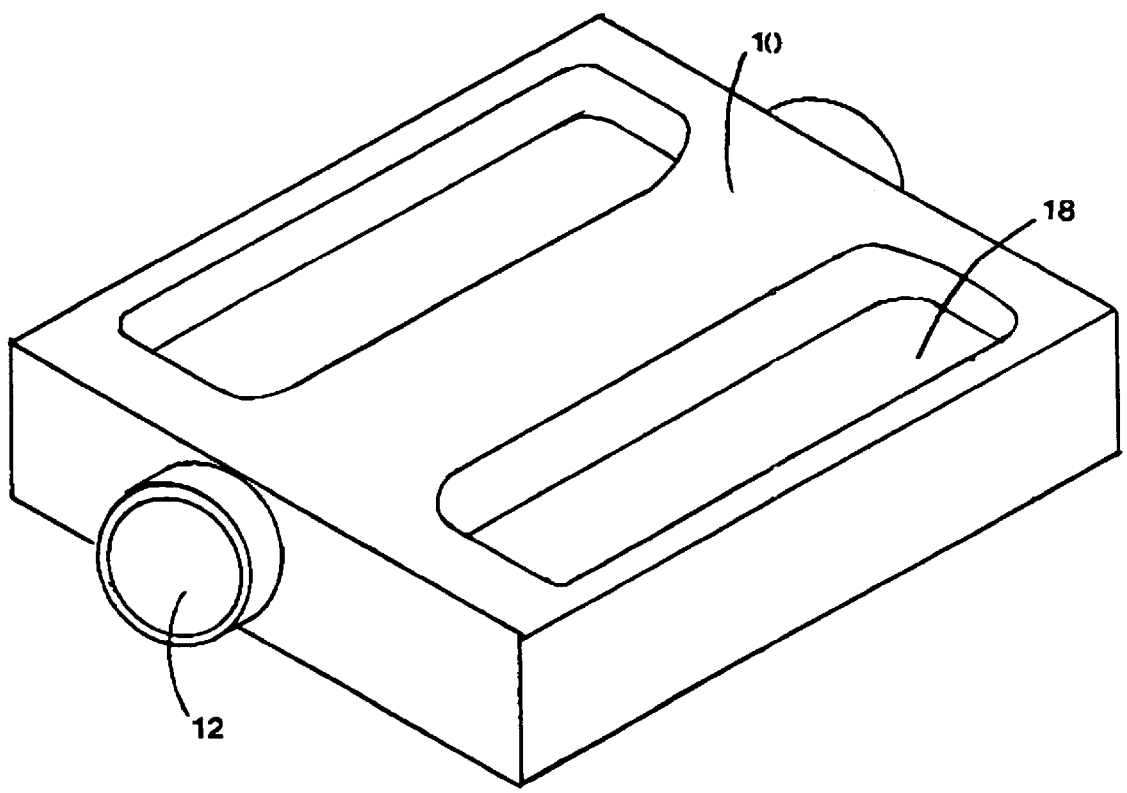
FIG. 2 illustrates a rear view of the pedal housing.

Referring to FIG. 2 is the showing of the rear view of the pedal housing 10 with the pedal housing bore 12 continuing from the other side.

Figure 3:
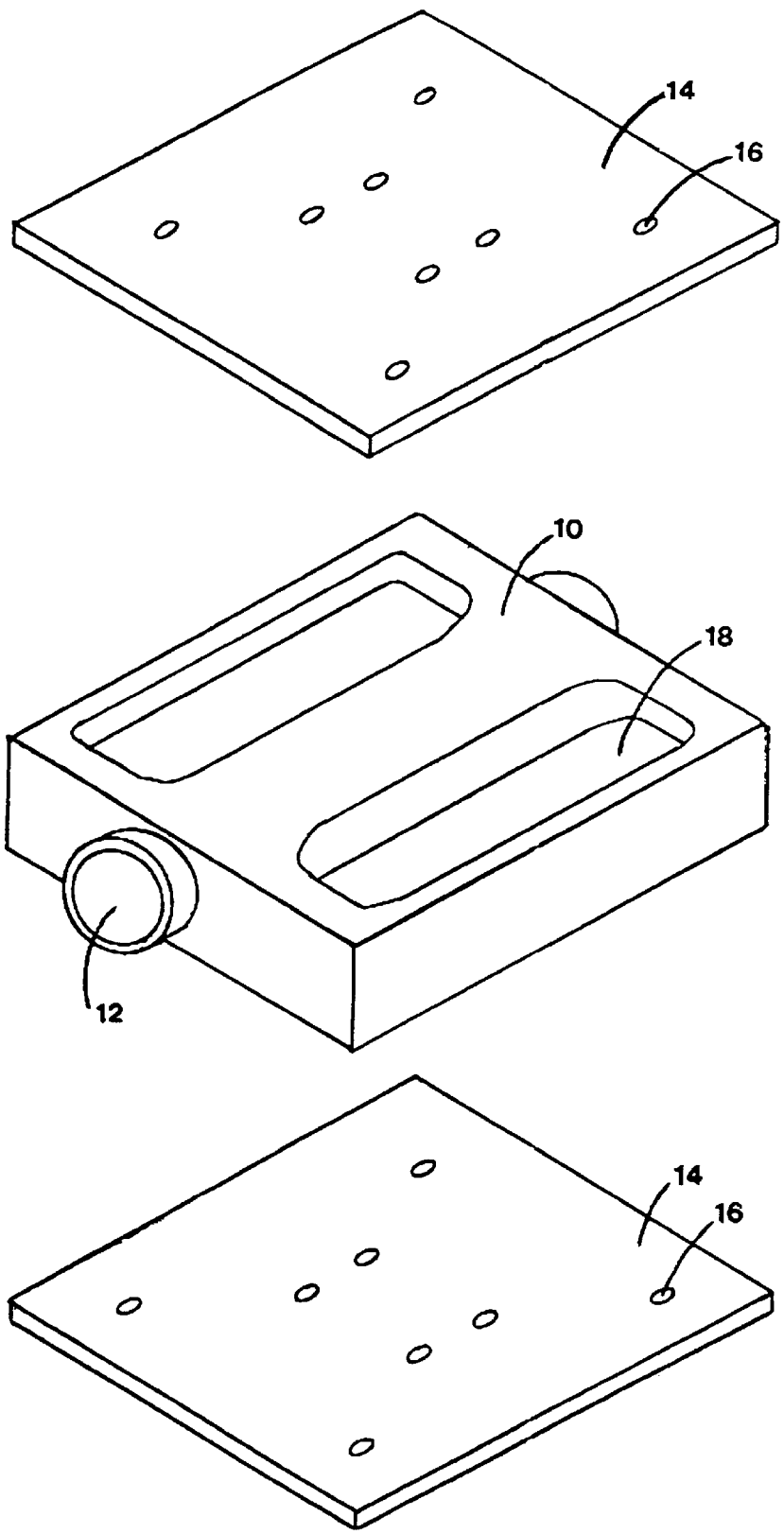
FIG. 3 illustrates the pedal housing plates in alignment with the pedal housing from FIG. 1.

Referring to FIG. 3 is the showing of the pedal housing plates 14 made of a plastic material that is squared with a plurality of pedal housing bores 16, positioned in direct alignment with the oblong pedal housing bores 18.

Figure 4:
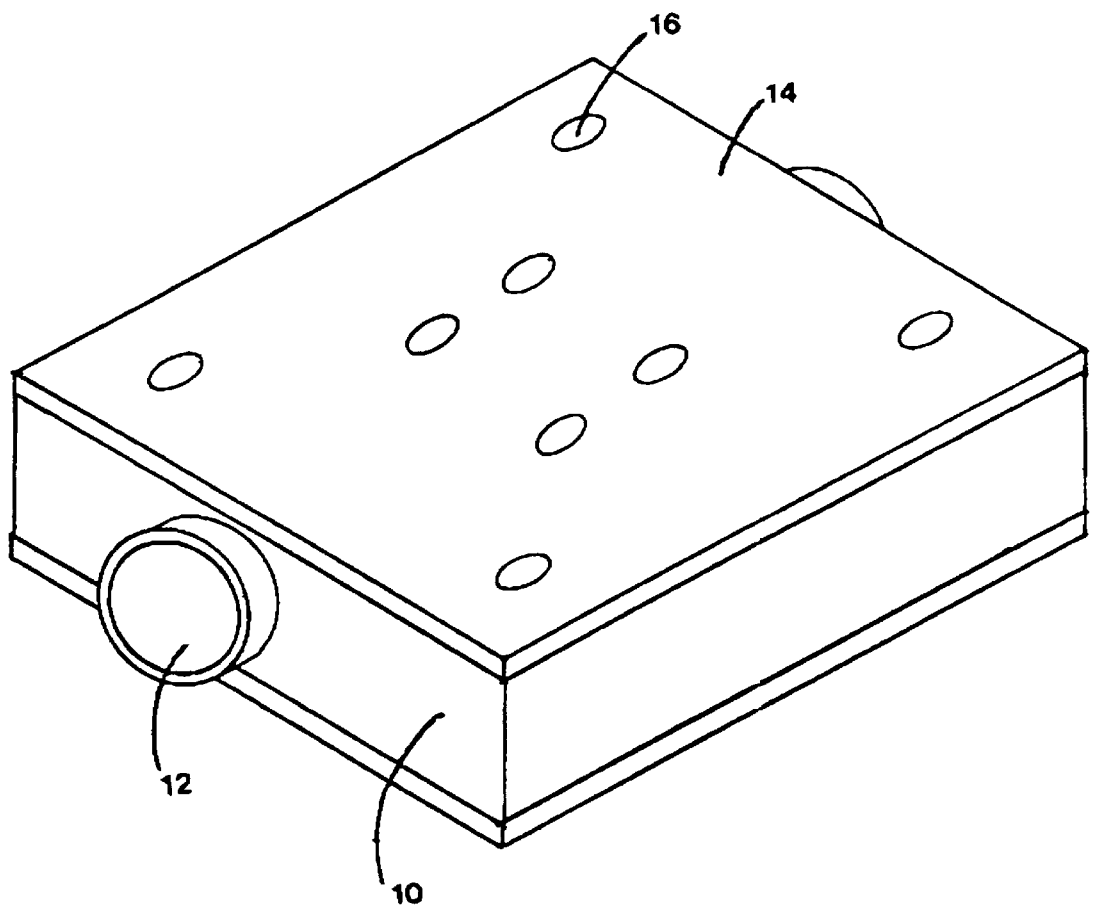
FIG. 4 illustrates the pedal housing and pedal housing plates mounted to the pedal housing.

Referring to FIG. 4 is the showing of the pedal housing plates 14 attached flushed to the surface of the pedal housing 10, by bonding means, such as adhesive.

Referring to FIG. 5 is the showing of the preferred embodiment in isometric exploded view without the pedal housing hood 36. The support disc 20 is shaped circular, with a small support disc bore 22 at the center, supporting the compression springs 34. The compression springs 34 is coiled to a predetermined specificity. The spring plates 24 is semi-squared with beveled edges on one side and right angles on the horizontal side. The spring plates 24 has spring plate bores 26 positioned in direct alignment with the pedal housing plate bores 16. The spring plates 24 has spring plate locking bores 28 positioned on the shoulder spaced to marry with the attaching spring plate bracket 30, with bracket locking pins 32. (FIG. 7 has a exploded view of 24, 26 and 28)

The spring plates 24 support the rubber discs 50. The rubber discs 50 is circular whereas, the rubber disc bores 52, are positioned in direct alignment with the spring plate bore 26, enabling the threaded rods 48 to pass through, unrestricted. The threaded rods 48 is tubular shaped and threaded on both ends of predetermined length, stabilizing the compression springs 34, support discs 20, and spring plates 24, on both sides of the pedal housing 10, bolted by means of bolt thread 46, made of a metal substance. Said threaded rods 48 is further stabilized by a plurality of bushings 54.

Referring to FIG. 6 is the showing of the side view of an isometric exploded view of the preferred embodiment without the pedal housing hood 36. The support disc 20 is shaped circular, with a small support disc bore 22 at the center, supporting the compression springs 34. The compression springs 34 is coiled to a predetermined specificity. The spring plates 24 is semi-squared with beveled edges on one side and right angles on the horizontal side. The spring plates 24 has spring plate bores 26 positioned in direct alignment with the pedal housing plate bores 16. The spring plates 24 has spring plate locking bores 28 positioned on the border spaced to marry with the attaching spring plate bracket 30, with bracket locking pines 32. (FIG. 7 has a exploded view 24, 26 and 28)

The spring plate 24 supports the rubber disc 50. The rubber disc 50 is circular whereas, the rubber disc bores 52, are positioned in direct alignment with the spring plate bore 26, enabling the threaded rods 48 to pass through, unrestricted. The threaded rods 48 is tubular shaped, threaded on both ends of a predetermined length, supporting the compression spring 34, support disc 20, and spring plate 24, on both sides of the pedal housing 10, bolted by means of bolt thread 46, made of a metal substance. Said threaded rods 48 is further stabilized by a plurality of bushings 54.

Referring to FIG. 7 is the showing of a top view of the spring plate 24 made of a plastic material with the spring plate bores positioned to receive threaded rods 48. Along the border of the spring plate 24 is the spring plate locking bores 28 for attaching the pedal housing hood 36.

Referring to FIG. 8 is the showing of the top view of the spring plate bracket 30 made of a plastic material with spring plate bracket locking pins 32 positioned along the border to clamp down and hold in place the pedal housing hood 36.

Referring to FIG. 9 is the showing of side view of the spring plate bracket 30 and the spring plate locking pins 32.

Referring to FIG. 10 is the showing of the top view of the pedal housing hood 36 made of a rubber material the pedal housing hood 36 is rectangular shaped made of a flexible material with ventilation hood bore 40 and a hood shaft bore 42, the border of the pedal housing hood 36 is lined with a attaching hood bores 44 positioned to receive the spring plate locking pines 32 that align with the attaching hood bore 38 to clamp both parts to the spring plate 24 through to the spring plate bore 26 to secure the entire pedal housing hood 36 around the pedal housing 10, the pedal housing hood 36 has a hood fastener 44 made of a metal material that secure the end of the pedal housing hood 36 from coming apart when the treading force is applied to the spring plate 24.

Referring to FIG. 11 is the showing of rear view of the exterior of the present invention assembled with the pedal housing hood 36 attached by the spring plate bracket 30 and snapped together by the hood fastener 44 with the hood shaft bore 42 exposing the pedal housing bore 12. FIG. 11 further shows the rubber discs 50 positioned on the spring plate 24 held down by the support discs 20 and bolt threads 50 connecting the threaded rods 48 (not shown).

I claim:

1. A pedal comprising:
    a pedal housing (10) with a bore (12) centered on opposite ends so as said bore (12) provide a means for said pedal housing (10) to spin in circular motion;
    a said pedal housing (10) further including a plurality of predetermined shaped bores (18) positioned in equal spacing within said pedal housing (10);
    a plurality of said pedal housing plates (14) bonded on the top and bottom of said pedal housing (10);
    a plurality of said pedal housing plates (14) further including a plurality of bores (16) positioned in sequential order on said pedal housing plates (14) in direct alignment with said predetermined shaped bores (18).

2. The depression of pedal of claim 1 wherein said pedal housing plates (14) support a plurality of support discs (20) wherein said support discs contain a bore (22) of predetermined size and dimension.

3. The said support discs (20) of claim 2 wherein said support discs (20) support a plurality of compression springs 34 resting on said support disc (20) surface sand plurality of compression springs (34) having a predetermined thickness, length and type.

4. The said plurality of compression springs (34) of claim 3 support the support discs (20) resting on said support discs (20), wherein said support discs (20) also assist in supporting a plurality of spring plates (24) whose spring plate bores (26) is in direct alignment with said support disc bores (22) center of said compression springs (34) said pedal housing plate bores (16) and said pedal housing bores (12).

5. The said plurality of spring plates (24) of claim 4 have in addition to said spring plate bores (26) a plurality of spring plate locking bores (28).

6. The said plurality of bores (26, 22, 16 and 12) in claim 4 is in direct alignment for a plurality of threaded rods (48) to pass through to said spring plates (24), through to said compression springs (34) through to said support disc bores (22) and through to said spring plates (24).

7. The said plurality of threaded rods (48) in claim 6 is stabilized and locked in on both ends by means of a plurality of bolt threads (46).

8. The said plurality of threaded rods (48) in claim 6 is further stabilized with a plurality of bushings (54) said bushings (54) is placed inside said pedal housing plate bores (16) to receive said threaded rods (48).

9. The said plurality of spring plates (24) in claim 5 is staged to receive a pedal housing hood (36) said pedal housing hood (36) having a predetermined dimensional length, thickness and shape.

10. The said pedal housing hood (36) in claim 9 has within a predetermined dimensional space, a pedal housing vent bore (40).

11. The said pedal housing hood (36) in claim 9 has within a predetermined dimensional space on the border of said pedal housing hood (36), a plurality of attaching pedal housing hood bores (38).

12. The said pedal housing hood (36) in claim 9 has within a predetermined dimensional space a plurality of hood shaft bores (42).

13. The said pedal housing hood (36) in claim 9 is aligned with said spring plate bores (28) connected by spring plate brackets (50) locked in by a plurality of spring plate bracket locking pins (32) of predetermined dimensions.

14. The said pedal housing hood (36) in claim 9 having at the utmost end of said pedal housing hood (36), a hood fastener (44) of predetermined dimensions.

\* \* \* \* \*